(12) United States Patent
Edelman et al.

(10) Patent No.: US 12,471,516 B2
(45) Date of Patent: Nov. 18, 2025

(54) SEED TREATMENT CHAMBER WITH UNAPPLIED LIQUID TREATMENT CAPTURE DEVICE AND METHODS OF USE

(71) Applicant: KSi Conveyor, Inc., Sabetha, KS (US)

(72) Inventors: Matthew J. Edelman, Sabetha, KS (US); Jason P. Kaeb, Sabetha, KS (US); Dominic E. Meyer, Sabetha, KS (US)

(73) Assignee: KSi Conveyor, Inc., Sabetha, KS (US)

( * ) Notice: Subject to any disclaimer, the term of this patent is extended or adjusted under 35 U.S.C. 154(b) by 624 days.

(21) Appl. No.: 17/819,364

(22) Filed: Aug. 12, 2022

(65) Prior Publication Data
US 2023/0068805 A1    Mar. 2, 2023

Related U.S. Application Data

(60) Provisional application No. 63/260,606, filed on Aug. 26, 2021.

(51) Int. Cl.
*A01C 1/06* (2006.01)

(52) U.S. Cl.
CPC ..................................... *A01C 1/06* (2013.01)

(58) Field of Classification Search
None
See application file for complete search history.

(56) References Cited

U.S. PATENT DOCUMENTS

| | | | |
|---|---|---|---|
| 3,912,231 A | 10/1975 | Weber | |
| 5,567,238 A * | 10/1996 | Long, Jr. | A01C 1/06 118/314 |
| 6,551,402 B1 * | 4/2003 | Renyer | A01C 1/08 118/19 |
| 6,582,516 B1 * | 6/2003 | Carlson | A01C 1/06 118/19 |
| 6,745,512 B1 | 6/2004 | Panzer et al. | |
| 9,616,442 B2 | 4/2017 | Kaeb et al. | |
| 10,729,061 B2 | 8/2020 | Kaeb et al. | |
| 10,772,254 B2 | 9/2020 | Herbster | |
| 10,986,770 B2 | 4/2021 | Forsyth | |
| 2006/0236925 A1 | 10/2006 | Lund | |

(Continued)

FOREIGN PATENT DOCUMENTS

WO    2022036342 A1    2/2022

*Primary Examiner* — Binu Thomas
(74) *Attorney, Agent, or Firm* — Coughlin Law Office; Stuart M. Aller; Daniel J. Coughlin

(57) ABSTRACT

A treatment discharge catcher may be positioned at a terminal end of a treatment chamber. The treatment discharge catcher has a sloped member and a liquid collector. The sloped member extends downwardly and outwardly from a liquid dispenser. The liquid dispenser coats a particulate material with a treatment. Unapplied treatment may coat an interior of the treatment chamber. The sloped member directs unapplied treatment towards the liquid collector. The liquid collector has an interior wall that extends upwardly towards the sloped member to form a slotted gap. The particulate material may be prevented passage through the slotted gap. The unapplied treatment flows along an underside of the sloped member through the slotted gap. The unapplied treatment releases at a release portion of the sloped member. A port May discharge unapplied treatment collected inside the liquid collector.

20 Claims, 9 Drawing Sheets

(56) References Cited

U.S. PATENT DOCUMENTS

Figure 1:
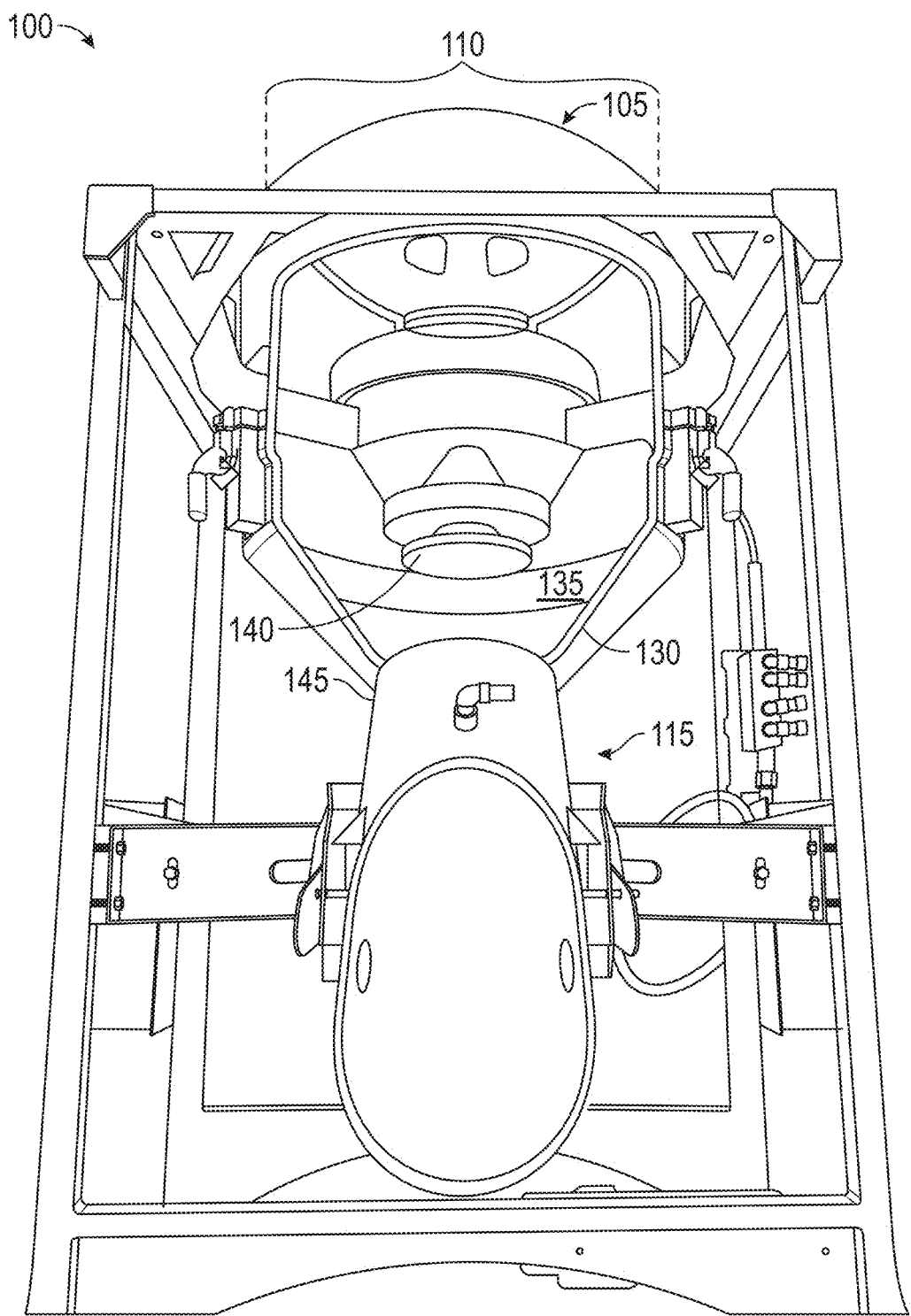

| | | |
|---|---|---|
| 2016/0060039 A1 | 3/2016 | Meyer et al. |
| 2016/0302352 A1 | 10/2016 | Tramp et al. |
| 2017/0135279 A1 | 5/2017 | Assy et al. |
| 2018/0220578 A1 | 8/2018 | Reineccius et al. |
| 2019/0075712 A1 | 3/2019 | Reineccius et al. |
| 2019/0133027 A1* | 5/2019 | Herbster .................. A01C 1/06 |
| 2019/0141881 A1 | 5/2019 | Reineccius et al. |
| 2019/0239417 A1* | 8/2019 | Forsyth .................... A01C 1/06 |
| 2020/0070190 A1 | 3/2020 | Badovick et al. |
| 2020/0102669 A1 | 4/2020 | Buntin et al. |

* cited by examiner

SEED TREATMENT CHAMBER WITH UNAPPLIED LIQUID TREATMENT CAPTURE DEVICE AND METHODS OF USE

CROSS REFERENCES

This application claims priority of U.S. Provisional Application No. 63/260,606 filed 26 Aug. 2021.

REFERENCE TO RESEARCH

Not Applicable.

REFERENCE TO CDS

Not Applicable.

TECHNICAL FIELD

The present disclosure relates to an apparatus, or methods of use thereof, for coating or dressing seed prior to sowing or planting, utilizing walls or sides to capture unapplied liquid treatment.

BACKGROUND

An agricultural seed treatment apparatus may have a seed treatment chamber. A particulate material, such as an agricultural seed, enters the seed treatment chamber. An applicator operably connected to a treatment source receives a treatment fluid and disperses the treatment fluid onto the agricultural seed. The treatment fluid is propelled using a liquid dispenser, such as an atomizer head, in a generally horizontal direction into contact with the agricultural seed. The agricultural seed contacts the treatment fluid while flowing through the seed treatment chamber.

SUMMARY

Excess, unapplied treatment, not in contact with the agricultural seed, encounters interior walls of the seed treatment chamber. The unapplied treatment moves towards a terminal end of the interior walls before flowing out of an outlet of the seed treatment chamber.

According to the present disclosure, a treatment discharge catcher may be disposed at a terminal end of the treatment chamber, such as a bottom edge of a chamber wall. The treatment discharge catcher may include a sloped member and a liquid collector. The sloped member may be located along the bottom edge of the chamber wall extending outwardly in an omnidirectional manner. The sloped member extends downwardly and outwardly away from the liquid dispenser. The sloped member may be substantially coextensive or integrally formed or linked with the chamber wall. The sloped member may direct an excess, unapplied amount of treatment from an interior side of the treatment chamber towards the liquid collector.

Particulate material travels through a vertical flow path inside the treatment chamber. The particulate material within the vertical flow path travels through the treatment chamber and the treatment discharge catcher.

Unapplied treatment flows in a non-vertical drip flow path, landing on and forming streams or rivulets along an inside surface of one or more walls of the treatment chamber. The unapplied treatment in contact with the chamber wall moves away from the vertical flow path of the particulate material along the drip flow path towards the treatment discharge catcher. A top surface of the unapplied treatment contacts an underside surface of the sloped member and moves towards the liquid collector, which may be due to forces of gravity and adhesion.

The liquid collector may be located below the sloped member, at a horizontal end of the sloped member or at the lowest vertical portion of the sloped member before an incline. At a drip point along a bottom side of the sloped member, the unapplied treatment falls or drips under the force of gravity into the liquid collector. The liquid collector may be a pan. A port may be located through the pan. The port may discharge unapplied treatment collected within the pan. An interior wall, such as a folded lip, of the pan may extend upwardly from the pan towards the sloped member. The pan may have a lower basin with an exterior lip. The exterior lip may extend upwardly from the lower basin. A lid may be located above the pan. The lid may encircle or circumscribe the sloped member.

Unapplied treatment is separated from the particulate material using the treatment discharge catcher. For example, a treatment fluid is propelled horizontally into contact with the particulate material within the vertical flow generated inside the treatment chamber. The particulate material coated with the treatment fluid flows through a central flow path. An unapplied quantity of the treatment fluid contacts an interior side of the chamber wall. The treatment discharge catcher directs the unapplied quantity of the treatment fluid towards a liquid collector. The treatment discharge catcher has a sloped member that extends downwardly and outwardly away from the treatment chamber, along a bottom edge of the chamber wall. The unapplied quantity of the treatment fluid travels along a non-vertical path along the sloped member towards a bottom side of the sloped member located outside the central flow path. The unapplied quantity of the treatment fluid releases into the liquid collector upon contacting a drip point of the sloped member.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

BRIEF DESCRIPTION OF DRAWINGS

Aspects are illustrated by way of example, and not by way of limitation, in the accompanying drawings, wherein:

FIG. 1 is a front view of one version of a treatment applicator, without the unapplied liquid treatment capture device, with a portion of the treatment chamber cutaway to show the liquid dispenser within.

FIG. 2 is a front perspective view of one version of a treatment discharge catcher positioned below a terminal end of the treatment chamber.

FIG. 3 shows an exploded view of the treatment discharge catcher of FIG. 2.

FIG. 4 shows a cross-sectional view of the treatment discharge catcher of FIG. 3.

FIG. 5 shows a close-up, cross-sectional view of an interior of the treatment discharge catcher of FIG. 4.

FIG. 6 shows a close-up, cross-sectional view of one side of the treatment discharge catcher of FIG. 5.

FIG. 7 shows a top perspective view of a version of a treatment discharge catcher with a lid removed to show details that would otherwise be hidden by the lid.

FIG. 8 shows a perspective view of a lower portion of the treatment discharge catcher of FIG. 7.

Figure 9:
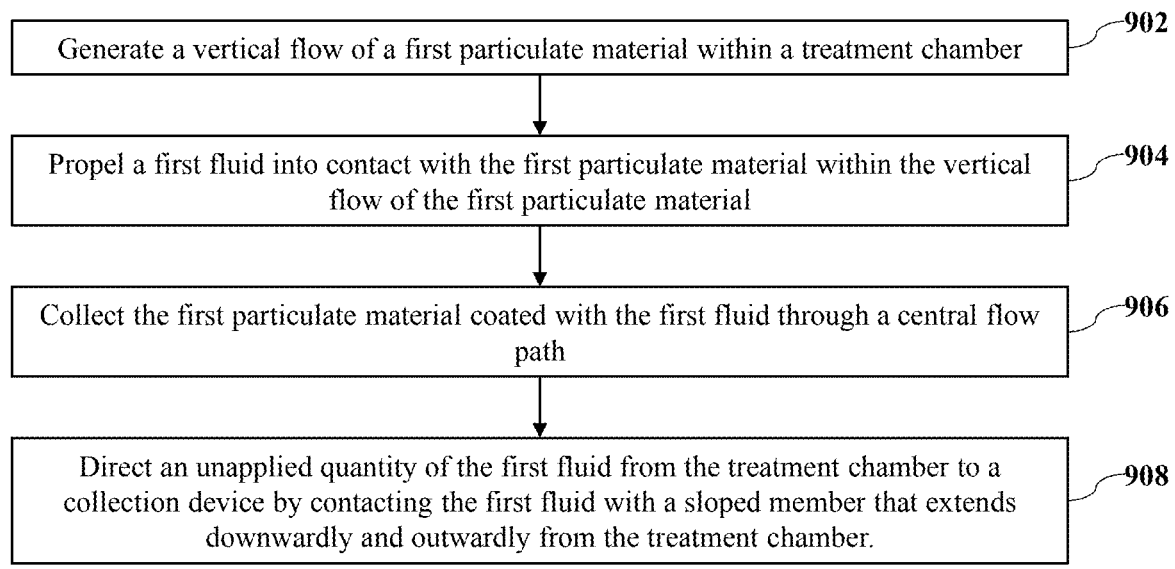

FIG. 9 shows a flowchart for separating materials with a treatment discharge catcher.

DETAILED DESCRIPTION

The treatment applicator may be an agricultural seed treatment applicator as disclosed in U.S. Pat. No. 10,729,061, published on 2020 Aug. 4, which is incorporated herein by reference. As shown in FIG. 1, a portion of the seed treatment chamber 110 is cutaway to better show the internal components (not showing the treatment discharge catcher). The seed treatment applicator 100 may have a seed treatment chamber 110. The seed treatment chamber 110 has an inlet chute 105 for receiving an incoming flow of a particulate material. The particulate material may be an agricultural seed 10 such as soybeans, corn, wheat, seed products, or a commodity. A discharge chute 115 is disposed at a lower portion of the seed treatment applicator 100 for dispensing the outgoing flow of agricultural seed 10. The agricultural seed 10 enters the inlet chute 105 of the seed treatment chamber 110 and may pass a liquid dispenser 140 within the seed treatment chamber 110. The seed treatment applicator 100 is fluidly connected to a treatment source. The seed treatment applicator 100 receives a treatment fluid from the treatment source and may route the treatment fluid to the liquid dispenser 140. The liquid dispenser 140 may disperse the seed treatment fluid onto the agricultural seed 10. An example of a liquid dispenser 140, such as an atomizer disc, is shown in FIG. 1. Alternatively, other liquid dispensers, such as spray nozzles, applicator brushes, applicator wheels, or a liquid injection device may disperse the seed treatment fluid. The liquid dispenser 140 dispenses and propels the seed treatment fluid horizontally into contact with the falling stream of agricultural seed 10. The agricultural seed 10 contacts the seed treatment fluid while the stream of agricultural seed falls under the force of gravity in a generally vertical path through the seed treatment chamber 110. Unapplied treatment 20, not in contact with the agricultural seed 10 may encounter an interior side 135 of the wall 130 of the seed treatment chamber 110. The unapplied treatment 20 may flow towards a terminal end 145 of the seed treatment chamber 110 into the discharge chute 115 of the seed treatment chamber 110

Figure 2:
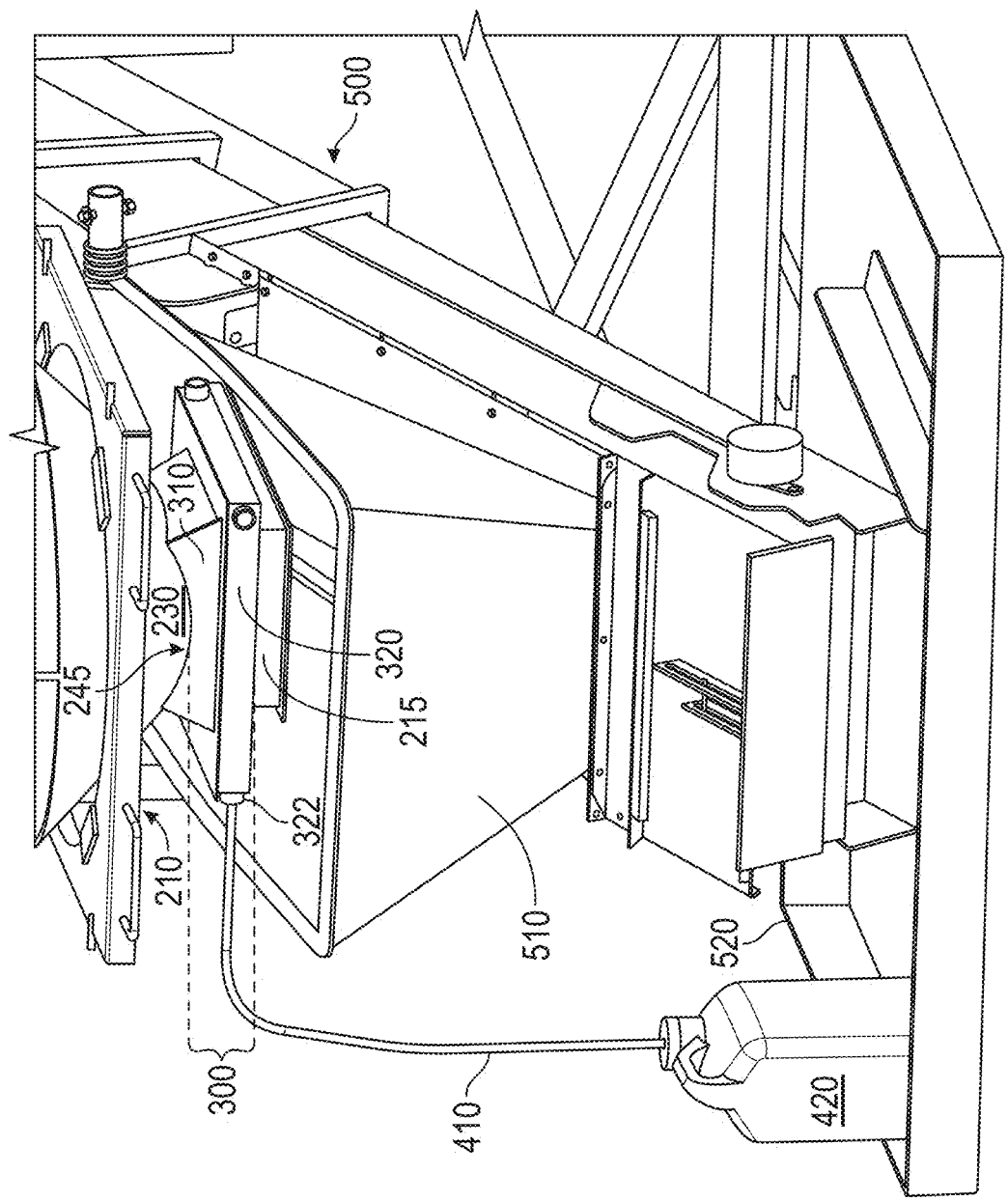

To stop the unapplied treatment 20 from dripping into receiving equipment, a treatment discharge catcher 300 may be provided at the terminal end 245 of the seed treatment chamber 210, as shown in FIG. 2. The treatment discharge catcher 300 directs and collects unapplied seed treatment flowing down along an interior side 235 of the chamber wall 230. An advantage to positioning a treatment discharge catcher 300 at a terminal end of a seed treatment chamber is that unapplied seed treatment is prevented from flowing directly into equipment below the discharge chute 215, such as a drying drum, seed conditioning chamber, or conveyor. In the example shown, unapplied seed treatment is received by the treatment discharge catcher 300 while a treated agricultural seed 10 is allowed to pass through the discharge chute 215 into a hopper 510 of a conveyor 500. Collecting unapplied seed treatment helps maintain the cleanliness and operational integrity of the hopper 510 and the conveyor 500. To accomplish this action, the treatment discharge catcher 300 includes a sloped member 310 and a liquid collector 320. The sloped member 310 extends downwardly and outwardly away from the liquid dispenser 140 previously shown in FIG. 1. The liquid collector 320 may be located below the sloped member 310. Unapplied seed treatment is directed by the sloped member 310 towards the liquid collector 320 for collection. Unapplied treatment that is collected may be directed through a discharge port 322 disposed through the liquid collector 320. A conduit 410 may be fluidly connected between the discharge port 322 and a container 420. In this way, the unapplied treatment is captured into the container 420 for later disposal or reuse.

Figure 3:
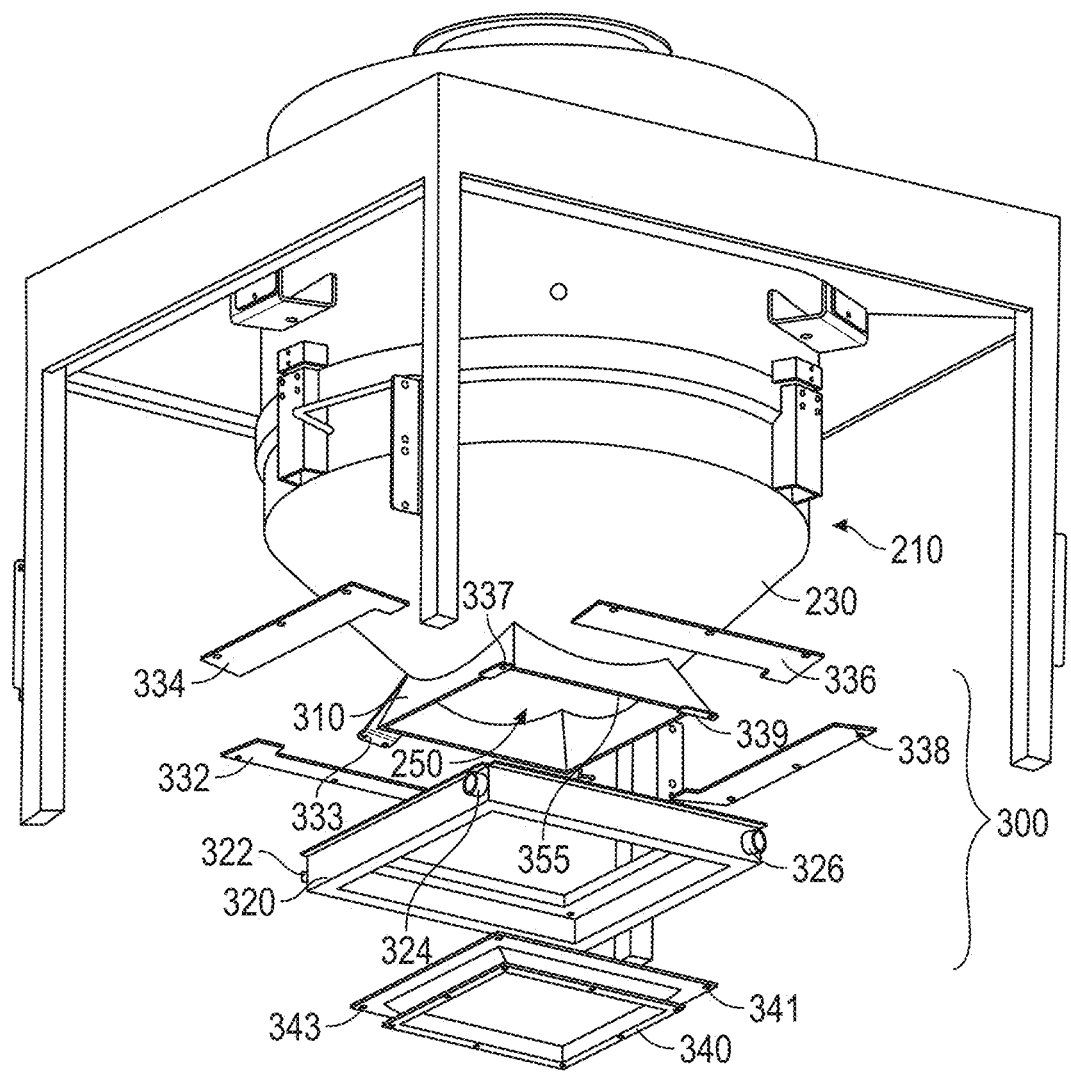

As shown in FIG. 3, an exploded view of the treatment discharge catcher 300 depicts the separated components. The sloped member 310 may be substantially coextensive and connected with a chamber wall 230 of the seed treatment chamber 210. In the example shown, the seed treatment chamber 210 tapers from top to bottom, as a funnel, from a larger diameter to a smaller diameter to direct seed or other particulate through the discharge opening 250. The discharge opening 250 is circular in shape and disposed at a central portion 255 of the seed treatment chamber 210 adjacent to a terminal end 245 of the chamber wall 230. The sloped member 310 may comprise an upper end that circumscribes the discharge opening 250 within the seed treatment chamber 210. The upper end of the sloped member 310 may be substantially coextensive with and mounted to the terminal end 245 of the seed treatment chamber 210.

In one instance, the sloped member 310 may be made of one piece that tapers from top to bottom, as a conical collar, from a smaller diameter to a larger diameter. Alternatively, as shown in FIG. 3, the sloped member 310 may comprise separate plates joined end to end and may form a perpendicular angle. The surface texture of the sloped member 310 may be smooth, channeled, or contoured based on a drip flow path 400 designed. The top edge of a plate of the sloped member 310 may be curved to match the curve of the chamber wall 230 of the seed treatment chamber 210. The arcuate curve of the sloped member 310 may be concave. A sloped member 310 having a top side that is concave may be configured to join a convex portion of the chamber wall 230 of the seed treatment chamber 210. The plates of the sloped member 310 may be joined to the seed treatment chamber 210 through welding or be integrally formed by other means, such as plastic injection molding. The sloped member 310 may form a generally pyramid shape. The sloped member 310 may be configured to abut against the terminal end 245 of the seed treatment chamber 210 to surround the discharge opening 250. The bottom edge 355 of the sloped member 310 may be flat and configured to mount with the liquid collector 320 of the treatment discharge catcher 300. For this purpose, a plurality of mounting brackets 315, 333, 337, 339 with mounting apertures may extend generally perpendicular to the sloped member 310 along the bottom edge 355.

The liquid collector 320 configured to receive unapplied treatment directed from the sloped member 310. The liquid collector 320 may be disposed below and mount to the sloped member 310 via the plurality of mounting brackets 315, 333, 337, 339 positioned at a horizontal end of the sloped member 310.

A discharge port 322 may be configured to discharge the unapplied treatment 20 collected in the liquid collector 320. Unapplied treatment may be directed through the discharge port 322 disposed through the liquid collector 320. As previously discussed, a conduit 410 may be fluidly connected between the discharge port 322 and a container 420. In this way, the unapplied treatment is captured into the container 420 when discharged from the discharge port 322. The captured, unapplied treatment may be stored in the container 420 for later disposal or reuse. A plurality of discharge ports 322, 324, 326 may be disposed through an outside wall of the liquid collector 320. An advantage to having the plurality of discharge ports 322, 324, 326 may occur in instances where a quantity of unapplied treatment collected exceeds the capacity of an individual port to discharge. The plurality of discharge ports 322, 324, 326 increases the capacity of the liquid collector 320 to direct the quantity of unapplied treatment 20 to the container 420 or a plurality of containers. Alternatively, the conduit 410 may be fluidly connected to a vacuum source to draw the unapplied treatment 20 from the liquid collector 320 using vacuum pressure to increase the discharge rate.

A lid may be positioned above the liquid collector 320 to prevent dust or other debris from contaminating the unapplied treatment. Another advantage to the lid is the protection of operators from exposure to the unapplied treatment collected within the liquid collector 320. In one instance, the lid may be made of one piece and surround an outer face of the sloped member 310 when installed over the liquid collector 320. Alternatively, as shown in FIG. 3, the lid may comprise a plurality of plates 332, 334, 336, 338 positioned at generally perpendicular angles to the sloped member 310. An outside edge of a plate may comprise a plurality of apertures, such as aperture 331, for attachment to a top flange 329 of the liquid collector 320.

A transition member 340 may be positioned between the liquid collector 320 and the discharge chute 215 of the seed treatment applicator 100. The transition member 340 may be mounted to an underside of the liquid collector 320. The discharge chute 215 may be mounted to an underside of the transition member 340. The components may be held together by a plurality of fasteners. The plurality of fasteners may be installed through a plurality of apertures, such as apertures 341, 343 that are shown disposed through the components. The fasteners may be any type of sheet metal or concrete screw or bolt, or other fastener suited for the application. The plurality of apertures may be spaced apart along the components to meet specified measurements for the intended application.

Figure 4:
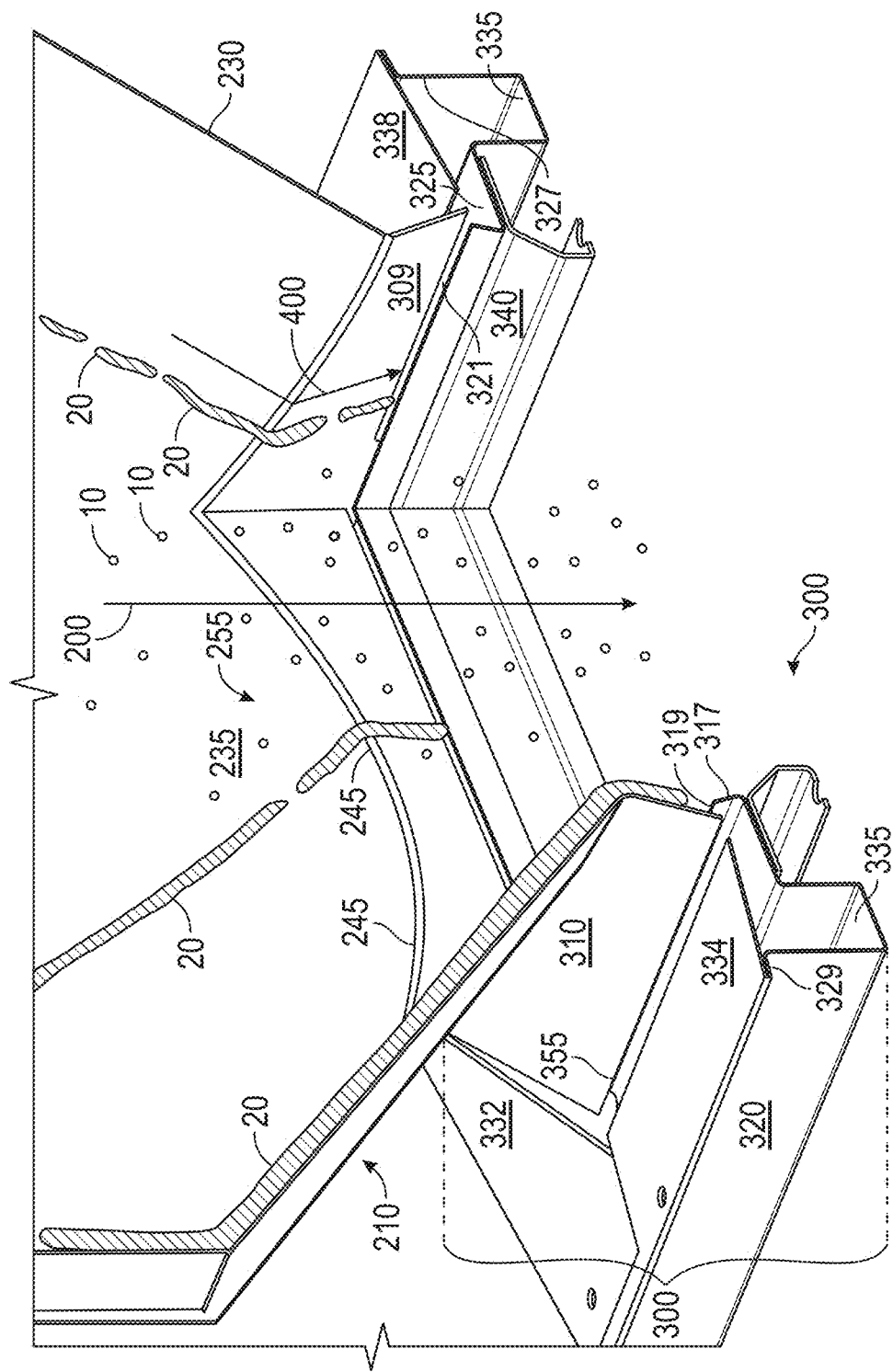

A cross-sectional view of a portion of the seed treatment chamber 210 and an interior of the treatment discharge catcher 300 is shown in FIG. 4. Upon being treated with a treatment fluid by a liquid dispenser 140 of a seed treatment applicator 100 (shown in FIG. 1), the agricultural seed 10 travels on a generally vertical or central flow path (arrow shows seed flow path 200) through the seed treatment chamber 210 and the treatment discharge catcher 300. An excess amount of the treatment fluid may contact an interior side 235 of the chamber wall 230 of the seed treatment chamber 210. The unapplied treatment 20 moves along the chamber wall 230 towards the treatment discharge catcher 300. The terminal end 245 of the seed treatment chamber 210 may be welded together with the top edge of the sloped member 310. Grinding the welded joint may make for a smooth transition for the flow of unapplied treatment 20. The unapplied treatment 20 may follow a non-linear path along the welded joint towards a central portion 255 of the seed treatment chamber 210 along the curved top edge of the sloped member 310.

Unapplied treatment 20 in contact with an underside 309 of the sloped member travels along a non-vertical flow path (arrow shows drip flow path 400) away from the seed flow path 200 of the agricultural seed 10. The pitch or angle of the sloped member 310 establishes the drip flow path 400 direction. In one example, the angle of the sloped member 310 may be based on maintaining an attractive force between the unapplied treatment 20 and the underside 309 of the sloped member 310, which, not being bound by any particular theory, may be cohesive or adhesive forces or some collection of these or other forces. In another example, an angle of the sloped member 310 from horizontal may be based on a vertical displacement distance between the terminal end 245 of the seed treatment chamber 210 and the pan of the liquid collector 320, 720. In another example, an angle from vertical may be based on a horizontal displacement distance between the terminal end 245 of the seed treatment chamber 210 and the drip point 311 for a treatment droplet 22.

A sloped member 310 may be attached to the seed treatment chamber 210 at a selected angle between the sloped member 310 and the chamber wall 230. The angle may be increased or decreased based on the forces between a fluid treatment and a surface of the sloped member 310. More specifically, the angle selected may be based on the ambient temperature within the treatment area or characteristics of the treatment fluid. In higher ambient temperatures, the fluid may drip more readily, so a sloped member with a steeper (more downward than outward) angle may be used. In such instances, the angle of the sloped member 310, from vertical, may be selected based on the type of fluid treatment applied. Not wanting to be bound to a theory, the forces between a fluid treatment and the surface of the sloped member 310 may be greater than or less than the adhesive forces between the fluid treatment and the surface of the sloped member 310. The angle of the sloped member 310 may range between the following: greater than 0° (degrees) to less than 90°; between 20° to 70°; between 30° to 60°; between 35° to 55°; between 40° to 60°; between 30° to 50°; or between 15° to 30°. The angle of the sloped member 310 in the figures is shown at approximately 22.5° from vertical.

Figure 5:
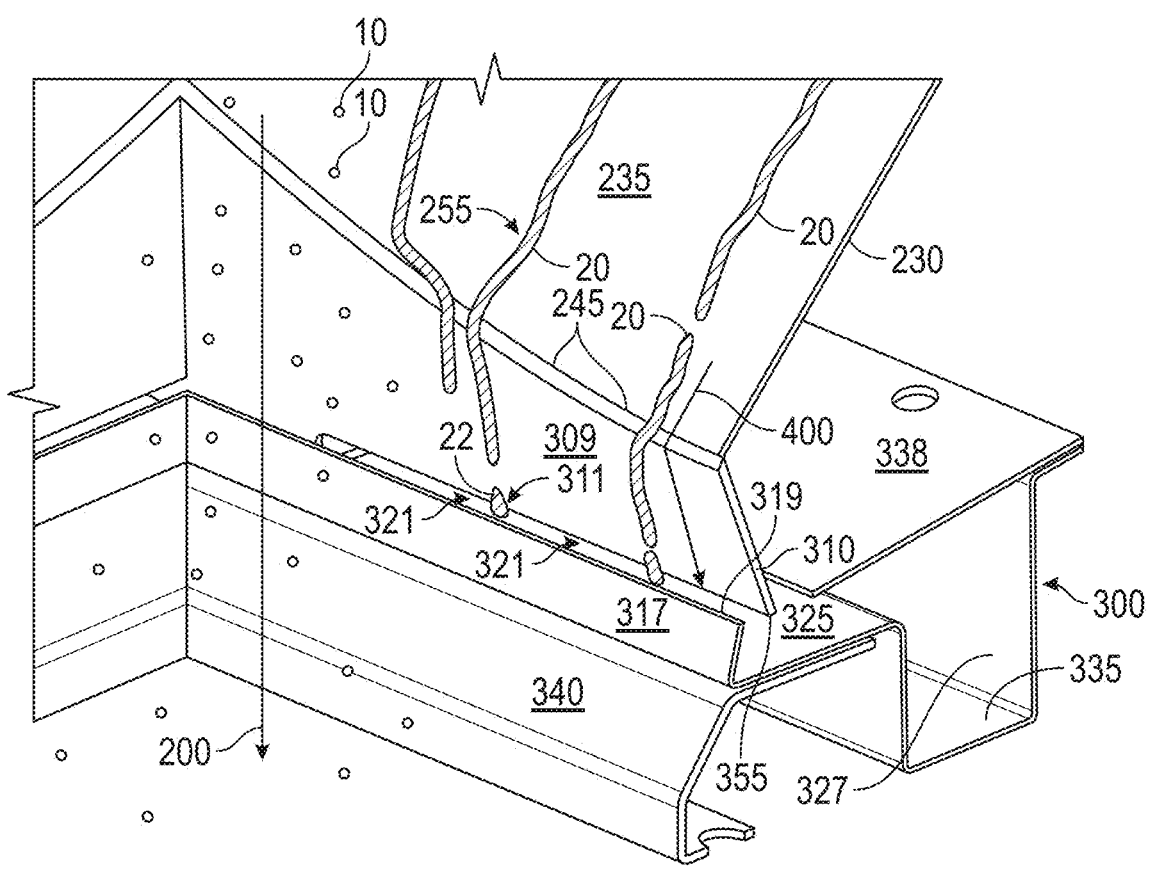
Figure 6:
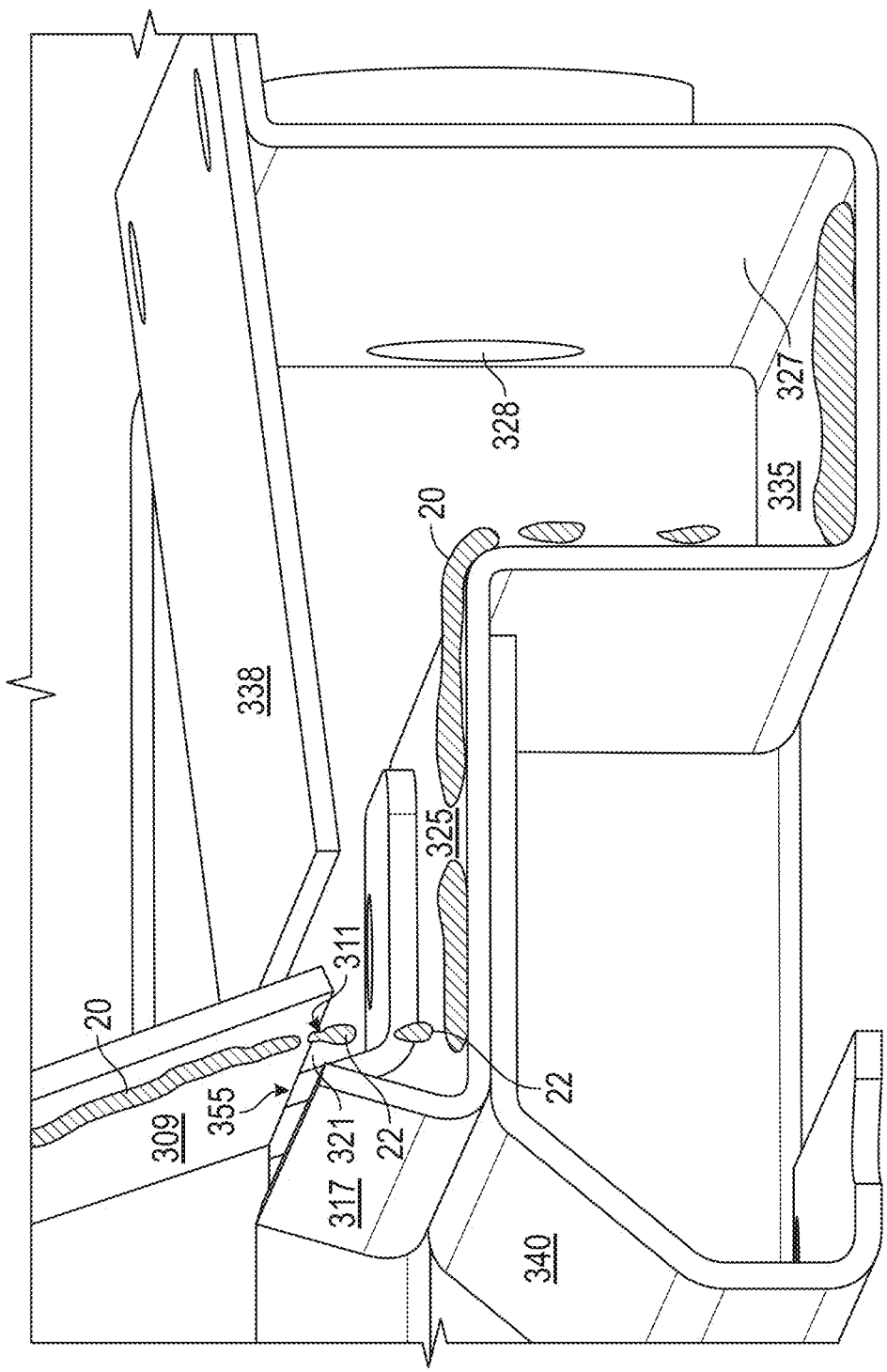
Figure 7:
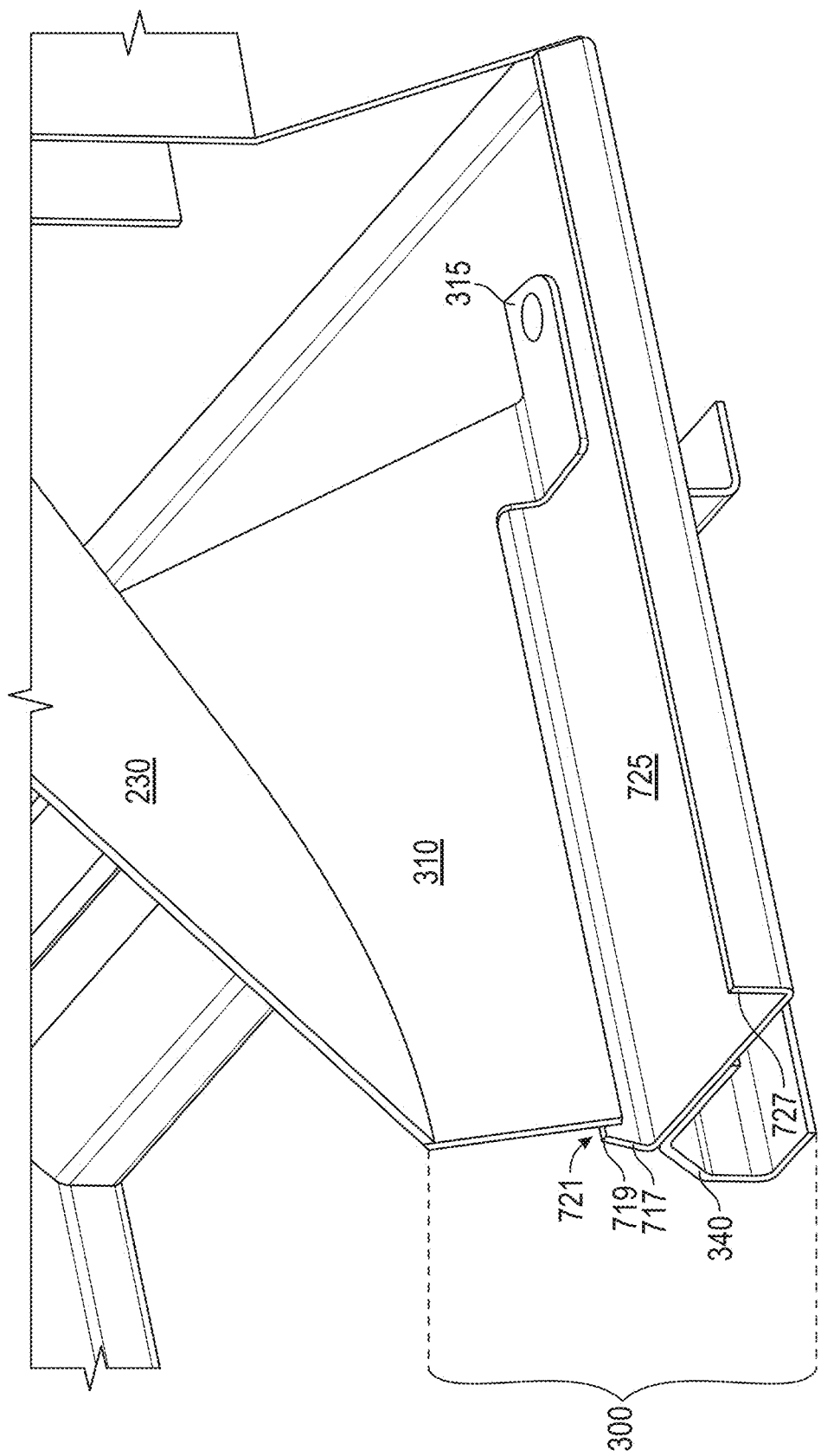
Figure 8:
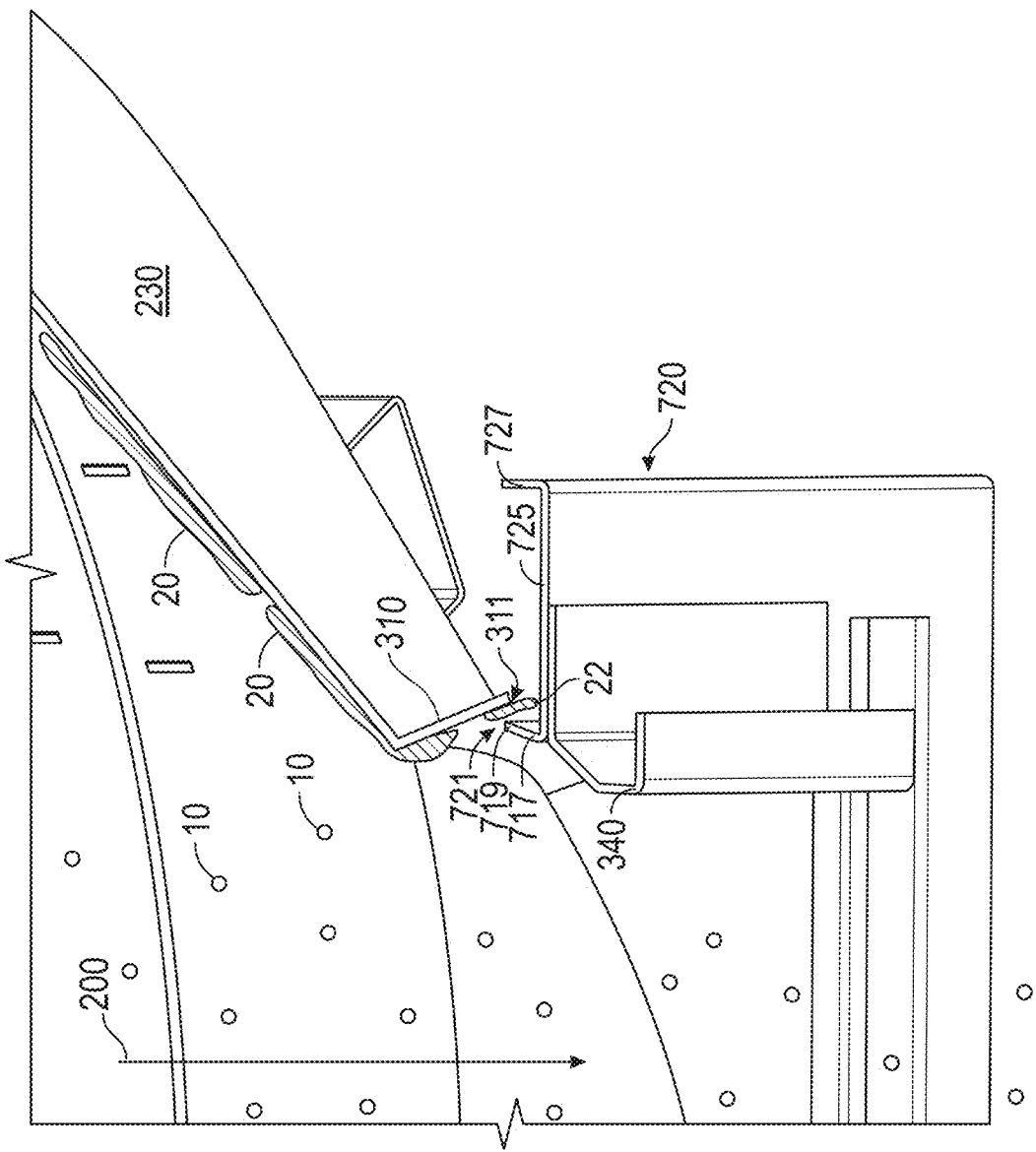

As shown in FIG. 5, FIG. 6, and FIG. 7, an interior wall 317, 717 is a raised or upfolded lip of the liquid collector 320, 720. The interior wall 317, 717 extends upwardly towards an underside 309 of the sloped member 310. A slotted gap 321, 721 is formed between a top edge 319, 719 of the interior wall 317, 717 and an underside 309 of the sloped member 310. A length of the slotted gap may be equal to or less than a length of a plate of the sloped member 310. A width of the slotted gap may be based on the size of the selected commodity and/or viscosity of the treatment fluid. The width of the slotted gap 321, 721 may be sized greater than a bead diameter size of a treatment droplet 22 of the unapplied treatment 20 to allow passage of the unapplied treatment 20 through the slotted gap 321, 721. The bead diameter size May correspond to the width of a treatment droplet 22, a rivulet, or steam of unapplied treatment that forms along a drip flow path 400. The force of gravity increases the bead diameter size until the weight of the unapplied treatment 20 overcomes the cohesive and adhesive properties and passes through the slotted gap 321, 721. The width of the slotted gap 321, 721 may be sized less than a seed diameter size, or width, of an agricultural seed 10 to prevent agricultural seed 10 from entering the liquid collector 320, 720. For smaller commodities, the width of the slotted gap 321, 721 may range from 0.25 centimeters (cm) to 0.75 cm in size. For larger commodities, the width of the slotted gap may range from 0.50 cm to 1.50 cm in size. In the case of treating agricultural seed, such as soybeans, the width of the slotted gap may be approximately 0.50 cm in size. The unapplied treatment 20 flows along the drip flow path 400 through the slotted gap 321, 721 before reaching the bottom edge 355 of the sloped member 310.

As shown in FIG. 6 and FIG. 8, the unapplied treatment 20 moves along the drip flow path 400 under the force of gravity while a top surface of the unapplied treatment 20 is in contact with the underside 309 of the sloped member 310. Adhesive forces between the unapplied treatment 20 and the sloped member 310 may allow the unapplied treatment 20 to pass along the drip flow path 400 through the slotted gap 321 at a generally horizontal angle. A discharge stream or a plurality of discharge streams of unapplied treatment 20 may form when the unapplied treatment 20 reaches the bottom edge 355 of the sloped member 310. As the flow of the discharge stream slows, a treatment droplet 22 or a plurality of treatment droplets may become heavy enough to fall under the force of gravity from a drip point 311 or a plurality of drip points located along the bottom edge 355 of the sloped member 310. Upstream flow of unapplied treatment 20 contributes to the formation and size of the discharge stream of treatment droplets that drip and fall from the sloped member 310 into the liquid collector 320.

As shown in FIG. 7 and FIG. 8, one particular version of a liquid collector 720 may have a pan 725 that has a base that is generally coplanar to horizontal. The pan 725 may be disposed below the sloped member 310. As illustrated, the pan 725 is disposed between the interior wall 717 and an exterior wall 727 of the liquid collector 720. Alternatively, as shown in FIG. 5 and FIG. 6, the pan may have an upper basin 325 and a lower basin 335. The interior wall 317 may extend upwardly from the upper basin 325. The exterior wall 327 may extend upwardly from the lower basin and be outwardly folded to form the top flange 329. The interior wall 317 and the exterior wall 327 contain the unapplied treatment 20 collected within the upper basin 325 and the lower basin 335 of the liquid collector 320. The lower basin 335 may have a holding capacity based on a rate of the unapplied treatment discharged. A discharge port or plurality of discharge ports may be disposed through a bottom, side, or end of the liquid collector 320. As shown in FIG. 6, a discharge port 328 is disposed through the exterior wall 327 of the liquid collector 320. The discharge port 328 may be located at a top, middle, or bottom portion of the exterior wall 327. Alternatively, the discharge port 328 may be disposed through the pan, such as the lower basin 335 of the liquid collector 320. As discussed previously and shown in FIG. 2, a conduit 410 may be fluidly connected between a discharge port 322 and a container 420. Alternatively, a waste treatment basin 520 may be provided for collection of the unapplied treatment discharged from the liquid collector 320.

A weight or volume of the unapplied liquid treatment captured may be measured and aid in determining the amounts of treatment applied. Calculating the difference of the captured amount of unapplied treatment against the expected application amount may help in the determination of an actual amount of a quantity and/or a flowrate of liquid treatment applied. Change in the weight or volume of the unapplied liquid being captured may be measured by conventional means. The quantity and/or a flowrate of liquid treatment applied may be adjusted to account for the difference between the actual and expected amounts. Further, multiple measurements may be performed together or sequentially for even greater redundancy and accuracy. This may lead to an overall reduction in the amount of unapplied liquid treatment being captured when treating seeds within the seed treatment applicator 100.

The treatment discharge catcher 300 may be mounted to a seed treatment chamber of an agricultural seed treatment applicator. Materials treated within the treatment chamber May be separated, according to a process 900. A vertical flow of a first particulate material is generated within a treatment chamber, according to step 902. A first fluid contacts the first particulate material within the vertical flow by being propelled horizontally outward from the liquid dispenser 140, according to step 904. The first particulate material coated with the first fluid flows in a central flow path through the treatment discharge catcher 300 to be collected, according to step 906. An unapplied quantity of the first fluid flows along an interior surface of the treatment chamber towards a liquid collector of the treatment discharge catcher 300. The unapplied quantity of the first fluid is directed towards the liquid collector by contacting the first fluid with a sloped member of the treatment discharge catcher 300, according to step 908. The sloped member extends downwardly and outwardly away from the treatment chamber and the liquid dispenser 140, while a wall of the treatment chamber extends downwardly and inwardly towards the liquid dispenser 140. The unapplied quantity of the first fluid travels a non-vertical path along the sloped member towards a drip point. The drip point is located outside the central flow path of the treated particulate material. A top surface of the unapplied quantity of the first fluid is in contact with an underside of the sloped member as it travels under the force of gravity. The drip point is a release portion of the sloped member where the force of gravity acting overcomes the adhesive force between the unapplied quantity of the first fluid and a surface of the sloped member. This action allows the unapplied quantity of the first fluid to fall from the sloped member into the liquid collector.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications 6 and variations are intended to fall within the scope of the appended claims.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

We claim:

1. An agricultural seed treatment applicator comprising:
a seed treatment chamber;
a liquid dispenser disposed within the seed treatment chamber;
a sloped member that extends downwardly and outwardly away from the liquid dispenser, wherein the sloped member is substantially coextensive with a wall of the seed treatment chamber;
a pan disposed below the sloped member; and
an interior wall of the pan extending upwardly from the pan, interior to the sloped member.

2. The agricultural seed treatment applicator of claim 1, wherein the sloped member is structured to direct an unapplied seed treatment from an interior side of the seed treatment chamber, at a terminal end, towards a drip point of the sloped member.

3. The agricultural seed treatment applicator of claim 1, further comprising:
a lid disposed above the pan, wherein the lid encircles the sloped member.

4. The agricultural seed treatment applicator of claim 1, the pan comprising:
an upper basin;
an interior wall extending upwardly from the upper basin towards the sloped member;
a lower basin; and
an exterior wall extending upwardly from the lower basin.

5. The agricultural seed treatment applicator of claim 1, further comprising:
a port disposed through the pan; and
wherein the port is configured to discharge an unapplied seed treatment collected in the pan.

6. The agricultural seed treatment applicator of claim 1, further comprising:
a slotted gap formed between a top edge of the interior wall and an underside of the sloped member.

7. The agricultural seed treatment applicator of claim 6, wherein the slotted gap is sized greater than a bead diameter size of a seed treatment droplet and less than a seed diameter size of an agricultural seed.

8. The agricultural seed treatment applicator of claim 6, wherein the slotted gap is approximately 0.50 centimeters in width.

9. An agricultural seed treatment applicator comprising:
a seed treatment chamber;
a liquid dispenser disposed within the seed treatment chamber;
a treatment discharge catcher disposed at a terminal end of the seed treatment chamber, the treatment discharge catcher comprising:
a liquid collector; and
a sloped member that extends downwardly and outwardly away from the liquid dispenser, wherein the sloped member is substantially coextensive with a wall of the seed treatment chamber and configured to direct an unapplied seed treatment from the seed treatment chamber to the liquid collector; and
a pan of the liquid collector disposed below the sloped member, wherein a port disposed through the pan is configured to discharge an unapplied seed treatment collected in the pan.

10. The agricultural seed treatment applicator of claim 9, further comprising:
a seed flow path defined by a flow of an agricultural seed through the seed treatment chamber and the treatment discharge catcher.

11. The agricultural seed treatment applicator of claim 10, further comprising:
a drip flow path defined by a flow of the unapplied seed treatment along a wall of the seed treatment chamber toward the liquid collector.

12. The agricultural seed treatment applicator of claim 11, wherein the sloped member extends downwardly and outwardly from the wall of the seed treatment chamber.

13. The agricultural seed treatment applicator of claim 12, wherein the liquid collector is disposed below a drip point at a bottom edge of the sloped member.

14. The agricultural seed treatment applicator of claim 12, further comprising:
a drip point along the drip flow path defined as a location where the unapplied seed treatment that moves along the drip flow path falls from the sloped member under the force of gravity.

15. The agricultural seed treatment applicator of claim 9, the pan comprising:
an upper basin, wherein the interior wall extends upwardly from the upper basin towards the sloped member;
a lower basin; and
an exterior wall extending upwardly from the lower basin.

16. The agricultural seed treatment applicator of claim 9, further comprising:
an interior wall extending upwardly from the pan, interior to the sloped member.

17. A method for collecting an unapplied agricultural seed treatment from a seed treatment chamber within an agricultural seed treatment applicator comprising the steps of:
dispensing, outwardly, a seed treatment by a liquid dispenser disposed within the seed treatment chamber;
collecting an unapplied quantity of the seed treatment from the seed treatment chamber with a sloped member that extends downwardly and outwardly away from the liquid dispenser, wherein the sloped member is substantially coextensive with a wall of the seed treatment chamber; and
directing, by the sloped member, the unapplied quantity of the seed treatment from the seed treatment chamber to a treatment discharge catcher disposed at a terminal end of the seed treatment chamber, the treatment discharge catcher comprising:
a liquid collector;
a pan of the liquid collector disposed below the sloped member; and
an interior wall of the pan extending upwardly from the pan,
interior to the sloped member.

18. The method of claim 17, wherein the unapplied quantity of the seed treatment travels along the sloped member towards a drip point located outside a central seed flow path.

19. The method of claim 17, wherein the unapplied quantity of the seed treatment contacts and travels along an underside of the sloped member through a slotted gap.

20. The method of claim 17, further comprising the step of:
discharging the unapplied quantity of the seed treatment collected in the pan from a port disposed through the pan.

* * * * *